United States Patent [19]
Goodwin

[11] Patent Number: 5,361,863
[45] Date of Patent: Nov. 8, 1994

[54] POWER TRANSMISSION FOR COUPLING A PRIME MOVER TO A VEHICLE

[75] Inventor: George Goodwin, Sandycove, Ireland

[73] Assignee: Wingood Holding Company Limited, Dublin, Ireland

[21] Appl. No.: 131,579

[22] Filed: Oct. 4, 1993

Related U.S. Application Data

[63] Continuation of Ser. No. 985,236, Dec. 2, 1992, abandoned, which is a continuation of Ser. No. 462,459, Jan. 9, 1990, abandoned.

[30] Foreign Application Priority Data

Jan. 11, 1989 [IE] Ireland ............... 69/89

[51] Int. Cl.$^5$ ............... B62K 11/00; B62M 23/02
[52] U.S. Cl. ............... 180/205; 180/65.2; 180/65.6; 180/220; 180/230; 280/210; 280/212; 280/217
[58] Field of Search ............... 180/205, 204, 219, 230, 180/65.1, 65.2, 65.6, 53.1, 344, 346, 337, 365, 366, 385, 170, 172; 280/216, 217, 210, 220, 212

[56] References Cited

U.S. PATENT DOCUMENTS

| | | | |
|---|---|---|---|
| 1,258,431 | 3/1918 | Myers | 280/217 |
| 1,329,940 | 2/1920 | Wallace | 280/217 |
| 2,252,871 | 8/1941 | Sohl | 180/53.1 |
| 2,607,613 | 8/1952 | Lesaunier | 280/217 |
| 2,743,789 | 5/1956 | Ferguson et al. | 180/53.1 |
| 3,759,339 | 9/1973 | Farrow | 180/65.6 |
| 4,397,369 | 8/1983 | Read . | |

FOREIGN PATENT DOCUMENTS

| | | | |
|---|---|---|---|
| 118949 | 9/1944 | Australia | 280/217 |
| 0219373 | 4/1987 | European Pat. Off. . | |
| 1573163 | 7/1969 | France . | |
| 2377318 | 8/1978 | France . | |
| 2439128 | 5/1980 | France . | |
| 1144610 | 2/1963 | Germany | 180/205 |
| 284377 | 1/1928 | United Kingdom . | |
| 327549 | 4/1930 | United Kingdom . | |
| 381310 | 10/1932 | United Kingdom . | |
| 496727 | 12/1938 | United Kingdom . | |
| 508461 | 6/1939 | United Kingdom | 180/205 |
| 593941 | 7/1946 | United Kingdom . | |
| 703800 | 2/1954 | United Kingdom . | |
| 721545 | 1/1955 | United Kingdom . | |
| 766907 | 1/1957 | United Kingdom | 180/205 |
| 886847 | 1/1962 | United Kingdom . | |
| 1074431 | 7/1967 | United Kingdom . | |
| 1532829 | 11/1978 | United Kingdom . | |
| 1591734 | 6/1981 | United Kingdom . | |

*Primary Examiner*—Mitchell J. Hill
*Attorney, Agent, or Firm*—Birch, Stewart, Kolasch & Birch

[57] ABSTRACT

A power transmission unit for coupling a prime mover to a vehicle, in particular a bicycle. The unit has a clutch assembly, a gear train, and a freewheel mechanism. The output shaft of the prime mover is connected to the input side of the clutch assembly. The output of the clutch assembly is connected to the input side of the gear train. The output side of the gear train is connected to the freewheel mechanism. The freewheel mechanism is connected to a first sprocket wheel. The first sprocket wheel and a second sprocket wheel are mounted together on a common freewheel which in turn is mounted on the crankshaft of the bicycle. The second sprocket wheel is connected to the rear wheel of the bicycle. In the absence of power from the prime mover, the bicycle may be used in a conventional manner. When in use, the prime mover drives the rear wheel of the bicycle via the clutch assembly, gear train, freewheel mechanism, sprocket wheels and the rear wheel.

23 Claims, 5 Drawing Sheets

POWER TRANSMISSION FOR COUPLING A PRIME MOVER TO A VEHICLE

This application is a continuation of application Ser. No. 07/985,236 filed on Dec. 2, 1992, now abandoned which is a continuation of application Ser. No. 07/462,459 filed Jan. 9, 1990, now abandoned.

1. BACKGROUND OF THE INVENTION

Field of the Invention

This invention relates to a power transmission. In particular, it relates to a power transmission for use in transmitting power from a prime mover to a vehicle. More particularly, it relates to a power transmission for use in transmitting power from an internal combustion engine to a bicycle, tricycle or other individual transportation means as well as lawnmowers and the like.

1. Description of Related Art

A standard simple bicycle has only one fixed gear ratio whereby one large crank-wheel in front drives a smaller cog wheel attached to the rear roadwheel. The ratio, or difference in circumference, between the front crankwheel and the rear cogwheel determines the number of revolutions achieved by the rear road wheel in relation to the revolutions of the crank wheel. The specification of an average single-gear bike allows for a reasonable speed to be achieved by an average rider, over level ground. However, when a steep gradient is encountered, the rider of the single gear bike has to dismount and push the machine until level ground is reached.

More sophisticated bicycles are fitted with from four to as many as fifteen speed gear trains. On the "A. T." or "Mountain" bike, fifteen speed gear trains are quite common. This selection of gears enables the rider to cycle up virtually any gradient and to cope with heavy winds, etc., without dismounting. However, no matter how the bicycle has improved in design, the machine and rider can only make the journey if the rider has enough energy to spare above that which is required to perform adequately, at whatever task, when he or she arrives at their destination, be it college, work or some leisure activity. For instance, a young student may have to cycle five or six miles to school, be attentive all day and then cycle home and get down to homework. Such a student suffers a disadvantage that the student living more conveniently to the school does not. In bad weather, particularly, this situation could result in a drop in performance. In the case of someone working, the consequences could be worse.

For most people there are no terrors in riding a bicycle. The main consideration with regard to a proposed journey are—length of journey, terrain to be travelled over, and energy.

One solution to these problems is to fit an engine of some kind to the bicycle. In fitting an engine to a bicycle the main problem to be solved is that of reducing the speed of the engine to a suitable speed for driving the wheels. The conventional approach to this problem is to have a friction or geared drive direct to the outer diameter of one of the road wheels of the bicycle. The drive wheel from the engine is of a very small diameter and this, combined with the very large diameter of the road wheel of the cycle, gives an effective speed reduction. A disadvantage of this system is that it does not allow for the use of different gears and so the engine is usually not operating at the best part of its torque/speed characteristic. This results in poor acceleration combined with low top speed. It is only in the mid-range that the system works effectively. For this reason systems of this kind have not been particularly successful.

In U.S. Pat. No. 4,397,369 to Read, there is disclosed a power transmission for a bicycle. In Read, the engine speed is reduced through a series of chains and sprockets and drive direct to a sprocket wheel mounted on the pedal crank. The normal chain drive and derailleur system is used to provide the necessary gearing to give effective performance. However, there are a number of disadvantages in the system disclosed by Read.

Read discloses the use of a chain saw motor to drive a bicycle. The bar from the chainsaw is removed and the centrifugal clutch of the chainsaw motor is rendered ineffective. A reduction gearing from the chainsaw drive sprocket to a larger sprocket is provided leading to a belt drive incorporating a further speed reduction combined with a friction clutch, and then to an output sprocket which is connected by a chain to the outer sprocket of the pedal crank shaft. This then drives the bicycle through the conventional chain and derailleur system.

Read uses a chainsaw engine which, being relatively large, is also relatively wide and requires considerable force to start. While chainsaw engines are started with the pullcord start, these generally require a considerable amount of force, so it is clear from Read that it would be dangerous to try to start the engine while riding the bicycle, as one would easily overbalance due to the enormous force required to be exerted by one hand while steering the bicycle. It can be seen from Read that the chainsaw engine is quite large and quite wide and therefore the knees have to be kept far apart when riding the bicycle which further affects the rider's comfort and balance.

Because it is not possible to start the chainsaw engine from the pullcord while in motion, Read finds it necessary to provide a clutch. The clutch is provided with a belt having a tensioning device which causes the belt to grip a large pulley or to slide loosely through diametrically opposite grooves of the pulley. By engaging this clutch manually while in motion, it is possible to use the momentum of the bicycle or the power being imparted to the pedals by the cyclist to transmit power back through the drive train so as to start the motor. In order that this should be possible, it was found necessary by Read, as indicated above, to block the centrifugal clutch of the chainsaw in the permanently engaged position. It will be appreciated that a centrifugal clutch is a device which only operates in one direction. The center shaft causes weights to swing outwards when the shaft accelerates so as to grip the outer drum. No matter how fast the outer drum is rotated, if the center shaft is not being rotated there will be no grip because there is no centrifugal force.

Another disadvantage of the Read invention is in relation to riding the bicycle while the engine is not functioning resulting from insufficient fuel or an engine malfunction. In that event Read disengages the manual clutch which reduces the belt tension around the large pulley. However, there will always be some friction due to the belt slipping around the pulley. If a powered cycle is to be effective at all, it must be possible to cycle it with a minimum of friction in the case where the engine is not functioning.

In general, the Read design is cumbersome, inefficient and very expensive to manufacture and assemble.

It is also very difficult to fit to a bicycle involving a large number of components which would have to be fitted. It would also be very difficult to remove it from the bicycle.

SUMMARY OF THE INVENTION

Some of the objects of the present invention are to provide a power transmission which is easily fitted to a bicycle and easily removed, easily brought into operation and easily taken out of operation, and which when out of operation does not provide a significant increased frictional drag. A further object of the present invention is to provide a power cycle which is not cumbersome in any way, and which can be easily ridden as an ordinary cycle.

Generally, it is an object of the present invention to overcome the above problems.

The invention, therefore, provides a power transmission for coupling a prime mover having an output side with an output shaft to the input side of a vehicle, such vehicle also having a vehicle output side which power transmission comprises a clutch means having a clutch input side and a clutch output side; a gear train having a gear train input side and a gear train output side; means for connecting the output shaft to the clutch input side; means for connecting the clutch output side to the gear train input side; means for connecting the gear train output side to the vehicle input side and, where there is interposed between the gear train output side and the vehicle input side, a first freewheel so that there is a unidirectional transmission of power from the prime mover to the vehicle.

The gear train preferably comprises a first toothed wheel adapted for connection to the clutch output side; a second toothed wheel and a third toothed wheel arranged coaxially and adapted for rotation in unison; a fourth and fifth toothed wheel arranged coaxially and adapted for rotation in unison; and a sixth toothed wheel; and wherein the first wheel is adapted to drive the second wheel; the third and fourth wheels are adapted for meshing engagement with each other; the fifth and sixth wheels are adapted for meshing engagement with each other; and the sixth wheel is mounted on an output shaft which constitutes the output side of the gear train; and wherein the gear ratio between the first and second wheels is in the range 1:1.5 to 1:3.5; the gear ratio between the third and fourth wheels is in the range 1:1.5 to 1:3.5; and the gear ratio between the fifth and sixth wheels is in the ratio 1:1.5 to 1:3.5.

Preferably, the first wheel and the second wheel are interconnected by a chain means.

Preferably, the freewheel means has a seventh wheel mounted thereon.

The invention also relates to a bicycle which comprises a frame supporting a front wheel; a rear wheel; a crankshaft; a prime mover; and a power transmission according to the invention; and wherein the rear wheel is driveable via a chain connected to a first sprocket wheel; the first sprocket wheel being mounted coaxially with a second sprocket wheel on a common freewheel mounted on the crankshaft rotatable by pedals; the second sprocket wheel being connected to the freewheel means so that, in use, the prime mover drives the rear wheel of the bicycle via the gear train and the freewheel means.

BRIEF DESCRIPTION OF THE DRAWINGS

The invention will be understood in greater detail from the following description of preferred embodiments thereof given by way of example only and with reference to the accompanying drawings in which.

DETAILED DESCRIPTION OF PREFERRED EMBODIMENTS

Figure 1:
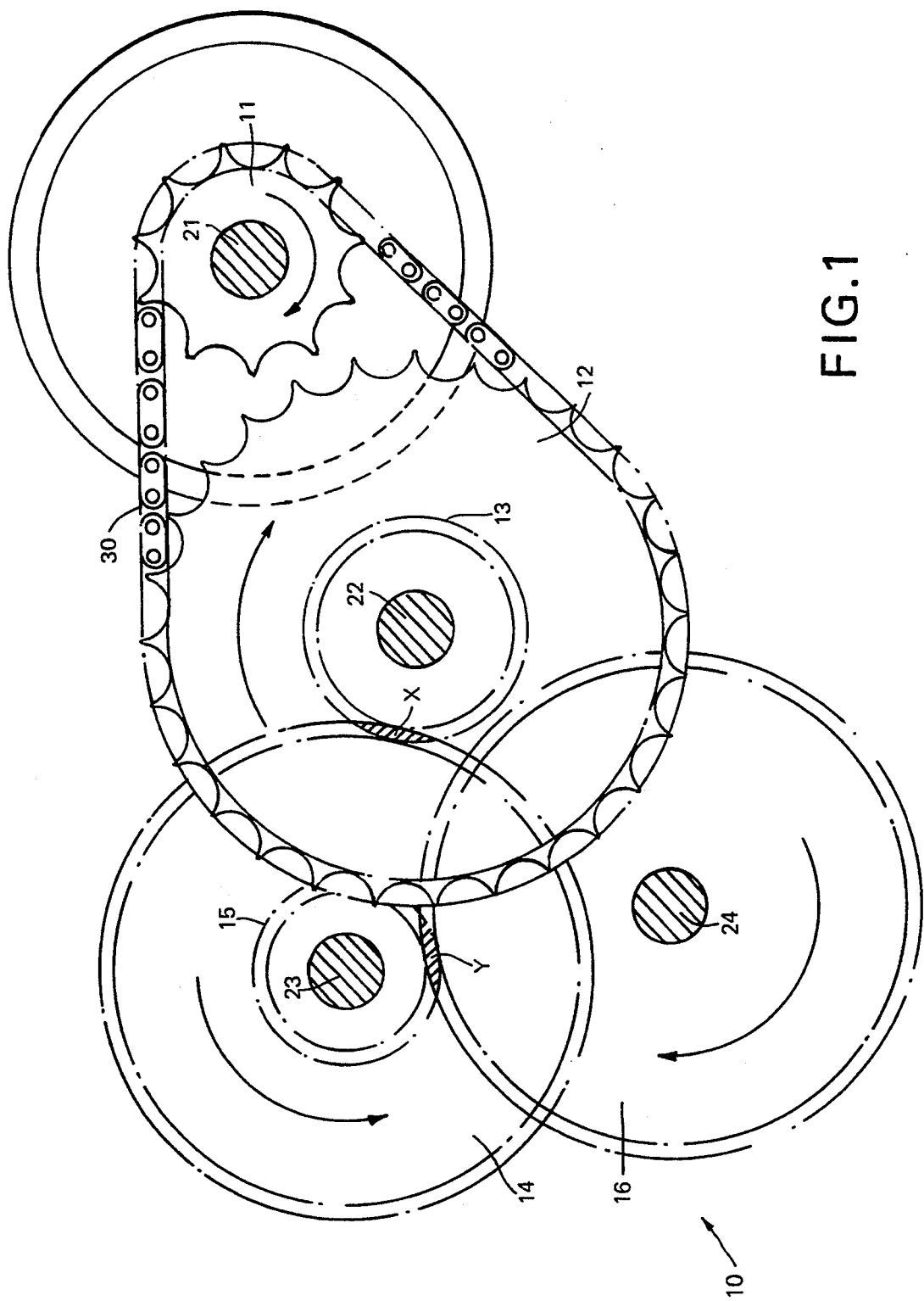
FIG. 1 is an elevation of a gear train for use with a power transmission according to the invention.
Figure 2:
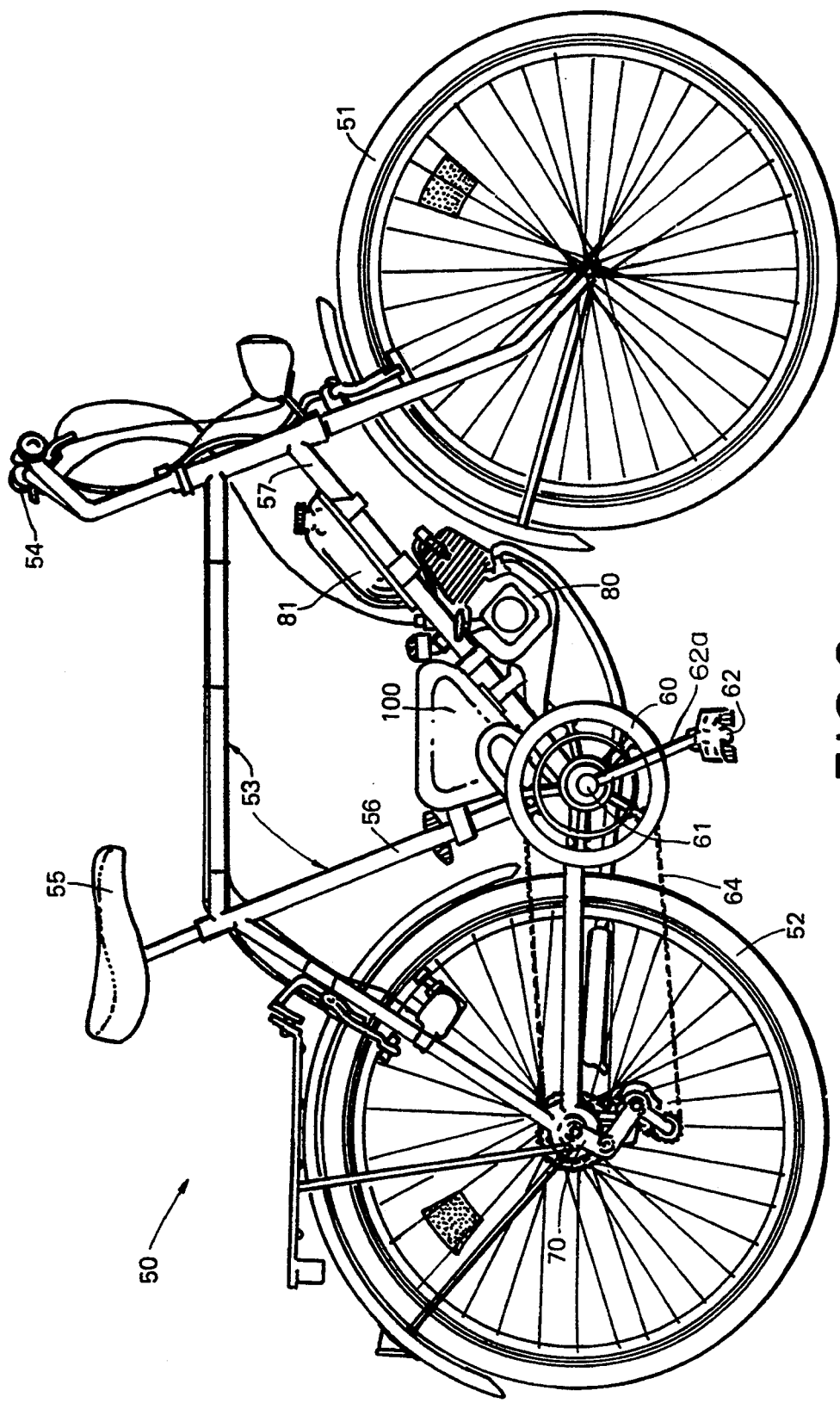
FIG. 2 is a perspective view of a first embodiment of a bicycle having a power transmission mounted thereon.

Referring now to the drawings and in particular to FIG. 1 thereof, there is shown a gear train 10 being part of a power transmission according to the invention which gear train 10 comprises a first toothed wheel 11, a second toothed wheel 12, a third toothed wheel 13, a fourth toothed wheel 14, a fifth toothed wheel 15; and a sixth toothed wheel 16.

The first wheel 11 is mounted on a first shaft 21; the second and third wheels are coaxially mounted fast on a second shaft 22; the fourth and fifth wheels are coaxially mounted fast on a third shaft 23; and the sixth wheel is mountable on a fourth shaft 24.

The first wheel 11 has eleven teeth thereon; the second wheel 12 has twenty-eight teeth thereon; the third or pinion wheel 13 has thirty-five teeth thereon; the fourth wheel has eighty teeth thereon; the fifth or pinion wheel 15 has thirty teeth thereon; and the sixth wheel 16 has eighty teeth thereon.

The third and fourth wheels 13, 14 are in meshing engagement at x; the fifth and sixth wheels 15, 16 are in meshing engagement at y. The second wheel 12 supports a chain 30 which also engages with the first wheel 11.

The arrangement between the wheels 11–16 provides the following gear ratios viz: between the first and second wheels 11, 12, the gear ratio is 1:2.55; between the third and fourth wheels 13, 14, the gear ratio is 1:2.88; between the fifth and sixth wheels 15, 16, the gear ratio is 1:2.66.

The gear ratios referred to above enable the first shaft 21, which is rotatable by an engine 80 at a velocity between 3000 and 6000 RPM. When rotating at 4000 RPM, the fourth shaft rotates at about 259 RPM with a concomitant increase in torque.

Figure 3:
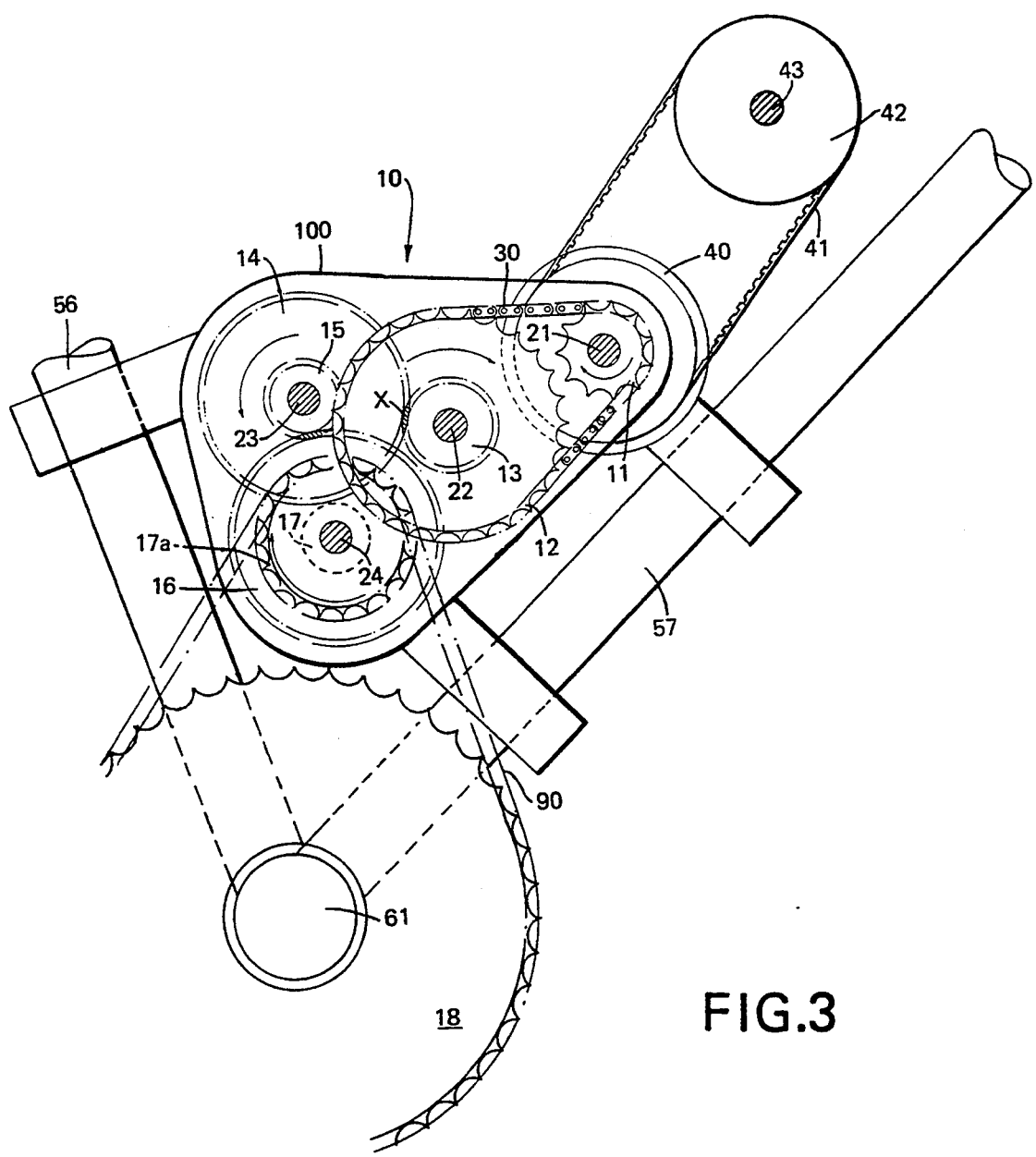
FIG. 3 is a detailed and enlarged view of part of the bicycle of FIG. 2 of the drawings.
Figure 4:
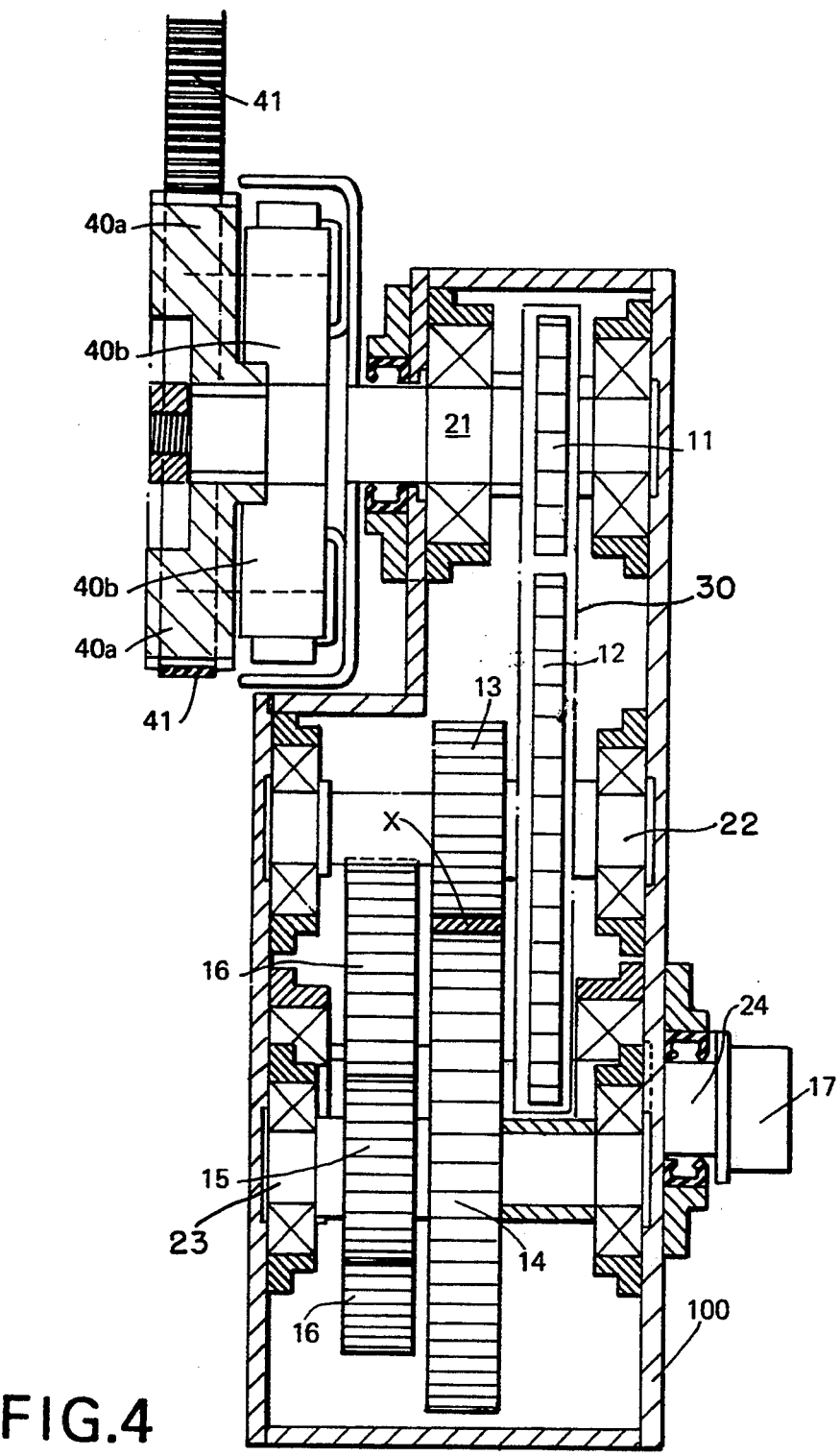
FIG. 4 is a plan view of the power transmission shown in use on the bicycle of FIG. 2 of the drawings.

In FIG. 4 of the drawings, there is shown a power transmission 200 according to the invention. The power transmission 200 comprises a clutch means in the form of a dry plate centrifugal plate clutch 40 having a clutch input side 40a and a clutch output side 40b; the gear train 10 and a first freewheel 17. The output side 40b of the clutch 40 is connected to the first toothed wheel 11 or input side of the gear train 10 being mounted on the first shaft 21. The fourth shaft 24, being the output side of the gear train 10 has the first freewheel 17 mounted thereon. The first freewheel 17 has a seventh toothed wheel 17a comprising fourteen teeth thereon. The seventh toothed wheel 17a is not shown in FIG. 4 of the drawings but is shown in FIG. 3.

Mounted on the shaft 21 is the input side 40a of the centrifugal clutch 40. A belt 41 connects the input side 40a to a toothed pulley 42 mounted on a shaft 43. The shaft 43 is the output or drive shaft of the engine 80.

The gear train 10 is enclosed in housing 100 having suitable outlets for the shafts 21 and 24. The housing 100 has suitable seals for enabling the gear train to be encased in oil. The housing 100 is shaped with an external recess so as to accommodate the centrifugal clutch 40. This enables the first shaft 21 to coaxially accommodate the output side 40b of the clutch 40 and the first wheel 11.

A bicycle 50 comprises a front wheel 51, a rear wheel 52, a frame 53, handle bars 54 and a saddle 55. Two bars 56, 57 of the frame 53 are shown in FIG. 3 of the drawings. The bicycle also includes a first sprocket wheel 60 (having forty-two teeth thereon), a crankshaft 61, pedals 62, pedal cranks 62(a) connecting the crankshaft 61 to respective pedals 62, and a chain 64 linking the first sprocket wheel 60 with, and serving to drive; the rear wheel 52 via a conventional rear sprocket and freewheel 70. The bicycle 50 is modified to accommodate the power transmission 200 according to the invention thereby enabling a relatively small petrol engine 80 having a tank 81 to power the bicycle 50.

In FIG. 3 of the drawings, the wheels 11-16 of the gear train 10 are shown. For reasons of clarity, the first sprocket wheel 60 has been omitted from FIG. 3 of the drawings.

Mounted on the crankshaft 61 is a second sprocket wheel 18 having forty-two teeth thereon. A chain 90 connects the sprocket wheel 18 with the seventh toothed wheel 17a. The second sprocket wheel 18 also has freewheel capabilities. Thus, the sprocket wheels 18 and 60, being mounted coaxially on a common (or second) freewheel 62b which is mounted on the crankshaft 61, can rotate in unison. The sprocket wheel 18 is located as the more inward of the two wheels. With the crankshaft 61 in a non-rotating condition, and thus with the pedals 62 stationary, the sprocket wheels 18, 60 are free to rotate by virtue of the common freewheel 62b. It will be observed that the second sprocket wheel 18 is mounted nearer the frame 53 when compared with the location of the first sprocket wheel 60.

In use, the bicycle 50 may be used in a conventional manner with the engine 80 inactive. Rotation of the pedals 62 will result in both sprocket wheels 18, 60 rotating. Power to the rear wheel 52 is transmitted via the chain 64 and the rear sprocket and freewheel 70. Power is also conveyed to the toothed wheel 17a via the chain 90. However, because the first wheel 17a is a freewheel (by virtue of the freewheel 17) relative to the fourth shaft 24, the fourth shaft 24 remains stationary. Thus power from the pedals 62 is not conveyed to the gear train 10 or the clutch 40 or the engine 80. Accordingly, with the engine 80 inactive, the bicycle 50 may be used in a conventional manner thus avoiding undue drag. By virtue of the rear sprocket and a third freewheel 70, when the pedals are stationary, the sprocket wheels 18, 60 together with the chain 64 and the chain 90 will also be stationary.

It will, of course, be appreciated that with this arrangement, the engine cannot be started by means of the pedals 62 or the rotation of the rear wheel 52 by virtue of the motion of the bicycle 50 downhill. In these circumstances, it is desirable that the engine 80 be of the type which can be started, for example, via a pull cord. A suitable engine 80 for this purpose would be a 33 cc trimmer engine or two stroke engine having a pull cord start facility. To provide for a compact and relatively narrow drive transmission, the centrifugal clutch of the engine is removed and the toothed pulley 42 is mounted coaxially with the flywheel on the shaft 43.

The centrifugal clutch of the engine may be incorporated into power transmission as the clutch 40.

With the engine 80 in operation at about 4000 RPM in respect of the wheel 42 which via the belt 41 drives the input side 40a of the centrifugal clutch 40, the output side 40b of the clutch 40 is engaged thereby driving the gear train 10 which ultimately drives the seventh toothed wheel 17a, the sprocket wheels 18, 60, the chain 64 and ultimately the rearwheel 52 via the conventional rear sprocket and a third freewheel 70. The conventional rear sprocket and third freewheel 70 may be used in a similar fashion as when used when driven by the pedals 62. Again, by virtue of the common freewheel 62b the sprocket wheels 18, 60 will rotate but the crankshaft 61 and the pedals 62 will remain stationary.

The sprocket wheels 18, 60 will be rotating at about 87 RPM with regard to the fact that the gear ratio between the toothed wheel 17a and the sprocket wheels 18, 60 is about 1:3.

If fitted, a derailleur or multi-speed hub may be utilized in a normal fashion with or without the engine 80 being in operation.

It will be appreciated that the gear train 10 may have other gear ratios. The following ranges of gear ratios have been found to be useful with regard to the compact nature and size of the gear train resulting in its usefulness as a gear train for use on a bicycle.

| Wheels | Ratio Range |
| --- | --- |
| 11 and 12 | 1:1.5 to 1:3.5 |
| 13 and 14 | 1:1.5 to 1:3.5 |
| 15 and 16 | 1:1.5 to 1:3.5 |
| 17 and 18, 60 | 1:2 to 1:4 |

Many bicycles have both sprocket wheels 18, 60 in position on the crankshaft 61 which sprocket wheels 18, 60 constitute part of the derailleur or multi-speed hub mechanism. By simply disengaging the sprocket wheel 18 from the derailleur mechanism and mounting sprocket wheels 18, 60 coaxially on the common freewheel 62b of the crankshaft 61, no other alteration to that part of the bicycle is needed to convert it for use with the engine 80. With regard to the compact nature of the power transmission 200 and the size of the engine 80, both of which can easily be accommodated on the frame of the bicycle as shown in the drawings, an extremely compact and useful power transmission transportation means is provided. Essentially, from a practical viewpoint, there are three main components via the engine 80 linked via the belt 41 to a clutch 40/gear train 10 which is in turn is linked via the first freewheel 17 and the chain 90 to the sprocket wheel 18. Thus, having mounted the engine 80 and the power transmission 200 on the frame of bicycle, the only linkages required and adjustments, if necessary, would be to the belt 41 and the chain 90.

There is thus provided an easy relatively inexpensive means of providing power to a conventional bicycle. The means for providing the power are easy to install and remove as described.

Furthermore, the bicycle uses a small capacity engine which can be easily started by pulling the pullcord while riding the bicycle. This means that it is not necessary to have drive connection from the pedals back up to the engine. The centrifugal clutch 40 can therefore be used to provide a drive from the engine to the bicycle as this is a one way clutch system. This avoids the necessity of having the manual clutch/belt tensioning device which Read uses. It also means that it is not necessary to block the centrifugal clutch on the engine output shaft as Read has found it necessary to do.

The invention also provides a first freewheel 17 on the output side of the gear train 10. This means that if the engine 80 is not functioning and the bicycle is being pedalled, the cyclist experiences the minimum drag since he only has to cycle against the extra friction of the chain 90 linked to the toothed wheel 17a. The cyclist does not experience the drag of a clutch system such as that provided by Read.

By using a smaller engine, there is avoided the problems of lack of comfort or convenience caused by the large size of engine which would require the cyclist to cycle with his knees far apart. The advantage of the first freewheel 17 means that if one wishes to switch from the powered mode to the non-powered mode, it is only necessary to use the engine throttle control to reduce the engine speed sufficiently for the centrifugal clutch 40 to disengage. From this point onwards the bicycle automatically functions as a non-powered bicycle, because of the automatic disengagement of the drive by the first freewheel 17. This is a feature not provided by Read who would have to manually disengage the clutch. Clearly if the engine should cease to function due to a fault, the bicycle of the present invention automatically reverts to a non-powered system whereas the Read cycle must be manually declutched.

A further advantage of the present invention is manner of mounting of the centrifugal clutch 40 on the first shaft 11 which has the advantage of reducing the width of the housing 100. By having a single gear train 200 as one integral unit which can be bolted to the engine, the power transmission is very easy to fit to the bicycle and equally easy to remove.

Figure 5:
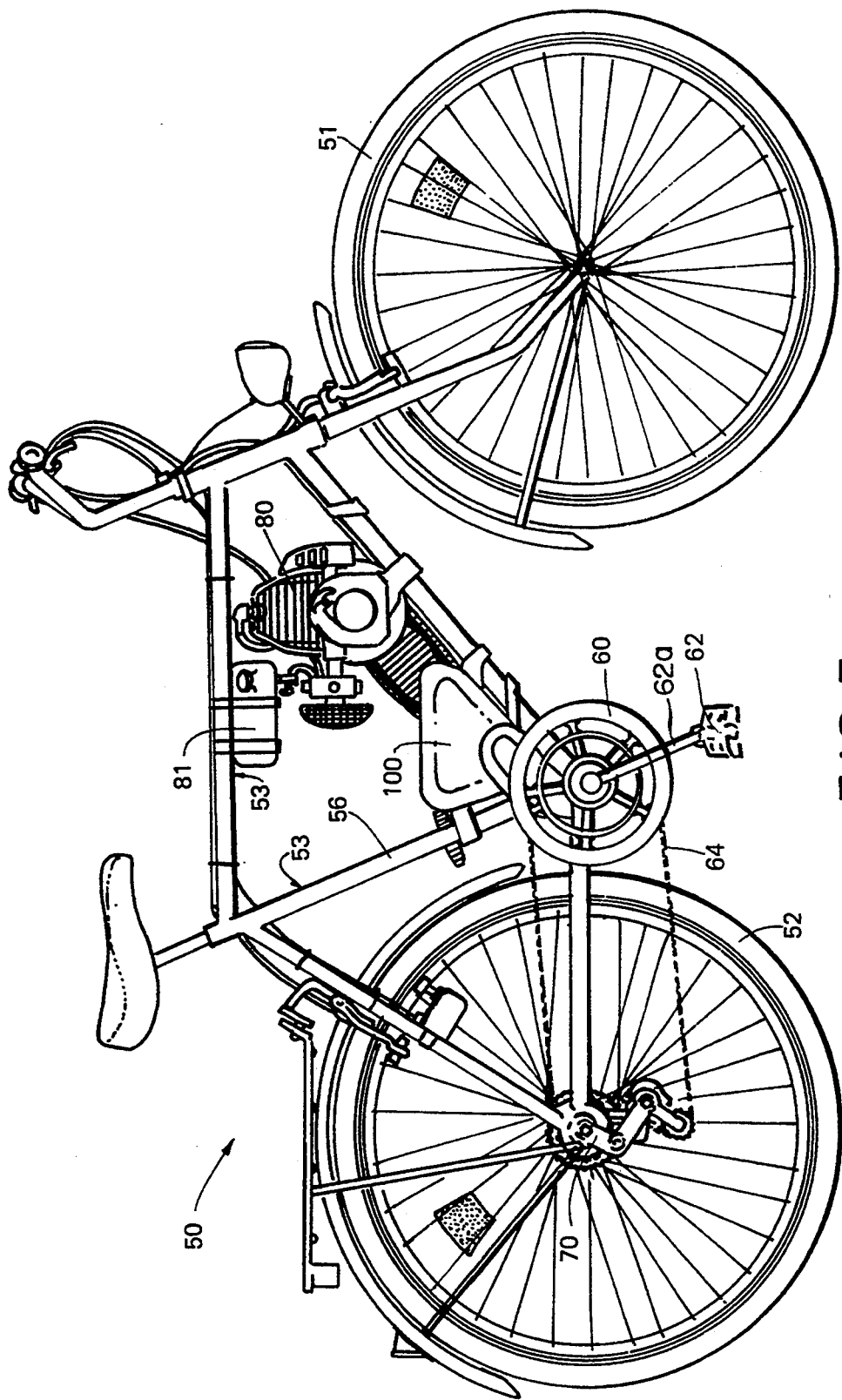
FIG. 5 is a plan view of a second embodiment of a bicycle of FIG. 2 of the drawings.

FIG. 5 shows the bicycle 50 having alternative positions for the mounting of the motor 80 and the tank 81.

It will be appreciated that the power transmission according to the invention may be used in a variety of other mechanical appliances such as lawnmowers, hedge trimmers, power tools, etc.

The invention is not limited by or to the specific embodiments described which can undergo considerable variation without departing from the scope of the invention.

What is claimed is:

1. A power transmission for coupling a prime mover to a vehicle; said prime mover having an output side corresponding to an input side of said vehicle, which power transmission comprises:
    a clutch member including a clutch input side and a clutch output side;
    a gear train assembly, the gear train assembly including a housing and a gear train having a gear train input side and a gear train output side;
    means for connecting the prime mover output side to the clutch input side;
    means for connecting the clutch output side to the gear train input side;
    means for connecting the gear train output side to the vehicle input side; and
    a first freewheel interposed between the gear train output side and the vehicle input side, whereby there is a unidirectional transmission of power from the prime mover to the vehicle.

2. The power transmission as claimed in claim 1 wherein the clutch member further includes a dry plate centrifugal clutch.

3. The power transmission as claimed in claim 1 wherein the housing contains an oilbath for the gear train.

4. The power transmission as claimed in claim 3 wherein the clutch member is mounted externally of the housing.

5. The power transmission as claimed in claim 1 wherein the clutch output side and the gear train input side are mounted coaxially on a first common shaft.

6. The power transmission as claimed in claim 1 wherein the gear train includes a first toothed wheel adapted for connection to the clutch output side; a second toothed wheel and a third toothed wheel, said second toothed wheel and said third toothed wheel being arranged coaxially and adapted for rotation in unison; a fourth toothed wheel and a fifth toothed wheel, said fourth toothed wheel and said fifth toothed wheel being arranged coaxially and adapted for rotation in unison; and a sixth toothed wheel; and wherein said first toothed wheel is adapted to drive said second toothed wheel; said third and fourth toothed wheels are adapted for meshing engagement with each other; said fifth and sixth toothed wheels are adapted for meshing engagement with each other; and said sixth toothed wheel is mounted on an output shaft which constitutes the output side of the gear train assembly; and wherein the gear ratio between said first and second toothed wheels is in the range 1:1.5 to 1:3.5; the gear ratio between said third and fourth toothed wheels is in the range 1:15 to 1:3.5; and the gear ratio between said fifth and sixth toothed wheels is in the ratio 1:1.5 to 1:3.5.

7. The power transmission as claimed in claim 6 wherein the gear ratio between said first and second toothed wheels is about 1:2.55; the gear ratio between the said third and fourth toothed wheels is about 1:2.88; and the gear ratio between said fifth and sixth toothed wheels is about 1:2.66.

8. The power transmission as claimed in claim 1 wherein said vehicle is a bicycle.

9. The power transmission as claimed in claim 8 wherein the vehicle input side includes a pedal crankshaft having a common freewheel mounted thereon, a first sprocket wheel and a second sprocket wheel, said first and second sprocket wheels being mounted coaxially on the common freewheel; wherein the first freewheel includes an output side, the first freewheel output side being connected to said second sprocket wheel; and wherein said first sprocket wheel is connected to the rear wheel of the bicycle.

10. The power transmission as claimed in claim 9 wherein said second sprocket wheel is mounted inward of said first sprocket wheel.

11. The power transmission as claimed in claim 1 wherein said prime mover comprises an engine assembly including a flywheel, a flywheel shaft, the flywheel being mounted on the flywheel shaft, wherein the clutch member comprises a centrifugal clutch, and wherein said prime mover output side connecting means includes a pulley and belt arrangement, the pulley being mounted on the flywheel shaft.

12. The power transmission as claimed in claim 1, wherein the vehicle input side comprises a pedal crank having a second freewheel mounted thereon, said second freewheel having an input side and an output side; and means for connecting the first freewheel to the second freewheel.

13. The power transmission as claimed in claim 12, wherein the second freewheel has a first sprocket wheel and a second sprocket wheel mounted thereon; the output side of the first freewheel is connected to the first sprocket wheel and the second sprocket wheel is connectable to the rear wheel of a bicycle on which the power transmission may be mounted.

14. A bicycle comprising a frame, said frame supporting a front wheel, a rear wheel, and a crankshaft; a prime mover; and a power transmission, said power transmission including a clutch member, the clutch member including a clutch input side and a clutch output side, a gear train assembly, the gear train assembly including a housing and a gear train having a gear train input side and a gear train output side, means for connecting the prime mover output side to the clutch input side, means for connecting the clutch output side to the gear train input side, means for connecting the gear train output side to the vehicle input side, and a first freewheel interposed between the gear train output side and the vehicle input side, whereby there is a unidirectional transmission of power from the prime mover to the vehicle, and a chain connected to a first sprocket wheel for driving the rear wheel; a common freewheel mounted on the crankshaft; a second sprocket wheel mounted coaxially with the first sprocket wheel on the common freewheel; and pedals for rotating the crankshaft; said second sprocket wheel being connected to the first freewheel whereby said prime mover selectively drives the rear wheel of the bicycle via the gear train and the first freewheel.

15. A power transmission for coupling in series a prime mover having an output shaft to the input side of a vehicle which is a bicycle, said vehicle also having an output side, which power transmission comprises:
a clutch having a clutch input side and a clutch output side;
a gear train having a gear train input side and a gear train output side;
means for connecting the output shaft to the clutch input side;
means for connecting the clutch output side to the gear train input side;
means for connecting the gear train output side to the input side of the vehicle; and
freewheel means, interposed between the gear train output side and the vehicle input side, for providing a unidirectional transmission of power from the prime mover to the vehicle;
the input side of the vehicle including a pedal crank having a common freewheel mounted thereon and a first and a second sprocket wheel mounted coaxially on the common freewheel;
wherein the output side of the freewheel means is connected to said second sprocket wheel and the first sprocket wheel is connectable to a rear wheel of the vehicle.

16. The power transmission according to claim 15, wherein said clutch is a dry plate centrifugal clutch.

17. The power transmission according to claim 15, further comprising a housing in which said gear train is mounted, wherein the housing contains an oil bath for said gear train.

18. The power transmission according to claim 17 wherein said clutch is mounted externally of said housing.

19. The power transmission according to claim 15, wherein said means for connecting the clutch output side to the gear train input side is a first common shaft.

20. The power transmission according to claim 15; wherein said gear train includes a first toothed wheel adapted for connection to the clutch output side; a second toothed wheel and a third toothed wheel, said second toothed wheel and said third toothed wheel being arranged coaxially and adapted for rotation in unison; a fourth toothed wheel and a fifth toothed wheel, said fourth toothed wheel and said fifth toothed wheel being arranged coaxially and adapted for rotation in unison; and a sixth toothed wheel; and wherein said first toothed wheel is adapted to drive said second toothed wheel; said third and fourth toothed wheels are adapted for meshing engagement with each other; and said sixth toothed wheel is mounted on an output shaft which constitutes the output side of said gear train; and wherein the gear ratio between said first and second toothed wheels is in the range 1:1.5 to 1:3.5; the gear ratio between said third and fourth toothed wheels is in the range 1:15 to 1:3.5; and the gear ratio between said fifth and sixth toothed wheels in the ratio 1:1.5 to 1:3.5.

21. The power transmission according to claim 20, wherein the gear ratio between said first and second toothed wheels is about 1:2.55; the gear ratio between said third and fourth toothed wheels is about 1:2.88; and the gear ratio between said fifth and sixth toothed wheels is about 1:2.66.

22. The power transmission according to claim 15, wherein the second sprocket wheel is mounted inward of the first sprocket wheel.

23. The power transmission according to claim 15, wherein said prime mover comprises an engine assembly including a flywheel mounted on a flywheel shaft, wherein said clutch is a centrifugal clutch, and wherein said prime mover output shaft is connected to the flywheel shaft via a pulley.

* * * * *